US009935318B1

(12) United States Patent
Surdoval et al.

(10) Patent No.: US 9,935,318 B1
(45) Date of Patent: Apr. 3, 2018

(54) SOLID OXIDE FUEL CELL CATHODE WITH OXYGEN-REDUCING LAYER

(71) Applicants: Wayne A. Surdoval, Monroeville, PA (US); David A. Berry, Mt. Morris, PA (US); Travis Shultz, Morgantown, WV (US)

(72) Inventors: Wayne A. Surdoval, Monroeville, PA (US); David A. Berry, Mt. Morris, PA (US); Travis Shultz, Morgantown, WV (US)

(73) Assignee: The United States of America Department of Energy, Washington, DC (US)

( * ) Notice: Subject to any disclaimer, the term of this patent is extended or adjusted under 35 U.S.C. 154(b) by 523 days.

(21) Appl. No.: 14/318,880

(22) Filed: Jun. 30, 2014

Related U.S. Application Data

(63) Continuation-in-part of application No. 12/837,757, filed on Jul. 16, 2010, now Pat. No. 8,802,316.

(51) Int. Cl.
*H01M 8/12* (2016.01)
*H01M 4/90* (2006.01)
(Continued)

(52) U.S. Cl.
CPC ........... *H01M 4/9033* (2013.01); *H01M 8/12* (2013.01); *H01M 4/8657* (2013.01);
(Continued)

(58) Field of Classification Search
CPC ........................................... H01M 2008/1293
See application file for complete search history.

(56) References Cited

U.S. PATENT DOCUMENTS 5,306,411 A * 4/1994 Mazanec .............. B01D 53/326
                                                    204/260
5,942,349 A * 8/1999 Badwal ............... H01M 8/0208
                                                    427/115
(Continued)

FOREIGN PATENT DOCUMENTS

CN         101022163    *  8/2007

OTHER PUBLICATIONS

Mutoro et al. Energy Environ. Sci., 2011, 4, 3689-3696.*
(Continued)

*Primary Examiner* — Alex Usyatinsky
(74) *Attorney, Agent, or Firm* — Felisa L. Leisinger; Michael J. Dobbs; Brian J. Lally

(57) ABSTRACT

The disclosure provides a SOFC comprised of an electrolyte, anode, and cathode, where the cathode comprises an MIEC and an oxygen-reducing layer. The oxygen-reducing layer is in contact with the MIEC, and the MIEC is generally between and separating the oxygen-reducing layer and the electrolyte. The oxygen-reducing layer is comprised of single element oxides, single element carbonates, or mixtures thereof, and has a thickness of less than about 30 nm. In a particular embodiment, the thickness is less than 5 nm. In another embodiment, the thickness is about 3 monolayers or less. The oxygen-reducing layer may be a continuous film or a discontinuous film with various coverage ratios. The oxygen-reducing layer at the thicknesses described may be generated on the MIEC surface using means known in the art such as, for example, ALD processes.

6 Claims, 2 Drawing Sheets

(51) Int. Cl.
*H01M 8/124* (2016.01)
*H01M 8/1213* (2016.01)
*H01M 4/86* (2006.01)
*H01M 8/1246* (2016.01)

(52) U.S. Cl.
CPC ........ *H01M 4/9025* (2013.01); *H01M 8/1213* (2013.01); *H01M 8/1246* (2013.01); *H01M 2004/8689* (2013.01); *H01M 2008/1293* (2013.01); *H01M 2250/20* (2013.01)

(56) References Cited

U.S. PATENT DOCUMENTS

| | | | | |
|---|---|---|---|---|
| 7,416,802 | B2 * | 8/2008 | Sammes | G01N 27/419 204/260 |
| 2004/0166386 | A1 * | 8/2004 | Herman | H01M 8/0606 429/415 |
| 2005/0214612 | A1 * | 9/2005 | Visco | C01B 13/0255 429/482 |
| 2010/0330450 | A1 * | 12/2010 | Huang | H01M 4/8621 429/480 |

OTHER PUBLICATIONS

Acta Mater. 48 (2000) 4709-4714.*
Yang et all, ACS Applied Materials & Interfaces (2014), 6(23), 21051-21059 (Abstract).*
Hong et al, ChemElectroChem (2016), 3(5), 805-813 (Abstract, late date).*
Hong et all, Electrochemistry Communications (2015), 51, 93-97 ( Abstract, late date).*
Gong. et all Journal of the Electrochemical Society (2013), 160(9), F958-F964 (Abstract, not single carbonates)).*

* cited by examiner

SOLID OXIDE FUEL CELL CATHODE WITH OXYGEN-REDUCING LAYER

GOVERNMENT INTERESTS

The United States Government has rights in this invention pursuant to the employer-employee relationship of the Government to the inventors as U.S. Department of Energy employees and site-support contractors at the National Energy Technology Laboratory.

RELATION TO OTHER APPLICATIONS

This patent application claims priority from non-provisional application Ser. No. 12/837,757 filed Jul. 16, 2010, which is hereby incorporated by reference.

FIELD OF THE INVENTION

One or more embodiments relates to a cathode for a Solid Oxide Fuel Cell, where the cathode comprises a MIEC having a thin layer of a single element oxide, single element carbonate, or mixtures thereof.

BACKGROUND

Solid oxide fuel cells (SOFC) are a class of fuel cell characterized by the use of a solid oxide material as an electrolyte, which conducts negative oxygen ions from a cathode to an anode. At the anode, the negative oxygen ions combine electrochemically with hydrogen and/or carbon monoxide to form water and/or carbon dioxide, respectively. Solid oxide fuel cells have a wide variety of civilian and military applications from use as power units in vehicles to distributed and central stationary power generation with outputs ranging from 100 W to 100's of MW, at an energy efficiency ranging from 40 to 60 percent depending on application. Like other types of fuel cells, solid oxide fuel cells can have multiple geometries. A typical planar fuel cell design has sandwich-type geometry, where a dense electrolyte is sandwiched between a porous cathode and an anode. This sandwich type geometry facilitates the stacking of hundreds of cells in series, with each cell typically having a thickness on the order of a few millimeters. Because the ceramics used in SOFC's do not become electrically and ionically active until they reach high temperatures, stacks of cells must typically run at temperatures ranging from about 500° C. to about 1000° C. depending on materials used.

Operation of a fuel cell begins by a reduction of oxygen into oxygen ions at the cathode, followed by diffusion through the solid oxide electrolyte to the anode, where they electrochemically combine with a fuel such as a syn gas ($H_2$ and CO) and/or light hydrocarbon fuel. Electrons are released at the anode and flow through an external circuit back to the cathode, performing electrical work. The anode is typically a porous material having relatively high electronic conductivity. The electrolyte is typically a dense layer of cermet with high ionic conductivity and essentially no electronic conductivity. The relatively high operating temperature of solid oxide fuel cells supports oxygen ion transport through the electrolyte.

The cathode of a fuel cell is typically a porous layer attached to the electrolyte where oxygen reduction takes place, and the ability to generate electricity in fuel cells at high current rates and efficiencies is generally limited by the cathode in a well designed and manufactured cell. Cathode materials must be, at a minimum, electronically conductive, and preferable cathode materials additionally possess at least some degree of ionic conductivity, in order to extend the active area for oxygen reduction beyond the triple-phase boundary (TPB) where electrolyte, oxidant and cathode meet. Identifying the best materials is the subject of significant current effort. Materials such as $La_{1-x}Sr_xMnO_{3-d}$ (LSM), $La_{1-x}Sr_xFeO_{3-d}$ (LSF), $La_{1-x}Sr_xCoO_{3-d}$ (LSC), and $La_{1-x}Sr_xCo_{1-y}Fe_yO_{3-d}$ (LSCF) have been investigated in detail. However, because oxygen reduction at the surface of the cathode is a slow reaction relative to hydrogen oxidation, efforts to improve the electrocatalytic nature of cathode materials in order to enhance the kinetics of the otherwise sluggish oxygen reduction reaction (ORR) are also being investigated. The cathode oxygen electrocatalyst has been one of the major limiting factors for energy conversion efficiency, cost, and stability of these devices.

One means of improving fuel cell cathode performance is through the use of a mixed ionic-electronic conductor (MIEC) with a thin coating of an electrocatalytic material residing on the MIEC. Such an approach is disclosed in U.S. patent application Ser. No. 12/837,757 having common inventors with the present disclosure, and which is here incorporated by reference in its entirely. Such a coating of electrocatalytic material as disclosed herein significantly improves overall cathode performance by establishing a dielectric/insulator surface between the MIEC and the electrocatalytic material, which significantly increases electron emissions and greatly accelerates oxygen reduction reactions at the cathode. This promotes increased current rates and efficiencies as the larger volume of available oxygen ions increases the diffusion of oxygen ions through the MIEC and electrolyte, and subsequently generates increased reactions with fuel at the anode/electrolyte interface. The oxygen reduction reaction is in virtually all cases the limiting kinetic reaction.

These and other objects, aspects, and advantages of the present disclosure will become better understood with reference to the accompanying description and claims.

SUMMARY

The disclosure provides a SOFC comprised of an electrolyte, anode, and cathode, where the cathode comprises an MIEC and an oxygen-reducing layer. The oxygen-reducing layer is in contact with the MIEC, and the MIEC is generally between and separating the oxygen-reducing layer and the electrolyte. The oxygen-reducing layer is comprised of single element oxides, single element carbonates, or mixtures thereof, and has a thickness of less than about 30 nm. In a particular embodiment, the thickness is less than 5 nm. In another embodiment, the thickness is about 3 monolayers or less. The oxygen-reducing layer may be a continuous film or a discontinuous film with various coverage ratios including a partial monolayer.

The MIEC comprising the cathode is a material having an electrical conductivity of at least 100 S/m at 800° C., and having a minimum ionic conductivity of 0.1 S/m at 800° C. The ionic transport number (ionic/electronic) is not important to an MIEC, unlike the electrolyte, if these minimum conductivities are met. In some embodiments, the MIEC has a crystal structure with a composition $A_xB_yO_{z-\Delta}$, where A is typically a metal other than transition metal, B is typically a transition metal, O is an oxygen anion bonded to both A and B, and z is a range of possible integers further characterizing the crystal type. In a further embodiment, the most common MIEC has a perovskite crystal structure with z having a value of 3. In further embodiments, the A component and B component may individually or together be composed of more than one element of the characteristic type. The oxygen-reducing layer at the thicknesses described may be generated on the MIEC surface using means known in the art such as, for example, Atomic Layer Deposition (ALD), Physical Vapor Deposition (PVD), Chemical Vapor Deposition (CVD) and other thermal evaporation or ablation techniques and variants The specific surface desired (thickness or number of layers/continuous or discontinuous) within the stated parameters and an acceptable manufacturing efficiency will dictate a specific process.

It is postulated that the identified surface will significantly enhance the cathode oxygen reduction reaction by increasing the rate of oxygen ion formation. The dielectric/insulating nature of the surface is generally significant to this improvement, and in certain embodiments, the number of surface layers and the continuous or discontinuous nature of the surface layers may be significant. The surface layer (s) comprise single or a mixture of oxides and/or carbonates of specified elements that will improve oxygen reduction, and in some embodiments further comprise single or a mixture of oxides and/or carbonates of specified elements that will enhance stability of the oxides and/or carbonates improving the oxygen reduction. The elements that enhance oxygen reduction will typically be from Groups 2 through 4 of the periodic table including the Lanthanides and specified Actinide elements along with Mn, Ta and Nb and Zn. The identified Group 13 and 14 elements of the periodic table may function as surface stabilizers to be applied individually but in conjunction with the elements providing enhanced oxygen reduction. The surface will be applied as a layer to the cathode after sintering the anode, electrolyte and cathode fuel cell structure. The layer will typically be subjected to a heat treatment that will approximate the operating temperature of the fuel cell but several hundred degrees Celsius lower than the lowest sintering temperature of the fuel cell anode, electrolyte and cathode structure.

The novel process and principles of operation are further discussed in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide an SOFC comprised of an electrolyte, anode, and cathode, where the cathode comprises an MIEC and an oxygen-reducing layer of single element oxides, single element carbonates, or mixtures thereof.

The disclosure provides a solid oxide fuel cell comprising an anode, electrolyte, and cathode, where the cathode comprises a mixed ionic-electronic conductor (MIEC) coated with an oxygen-reducing layer. The oxygen reducing layer comprises a single element oxide, single element carbonate, or mixtures thereof, and is present at a thickness of less than 30 nm, typically less than 5 nm. The oxygen reducing layer provides an electrocatalyst for the fast reduction and transportation of oxygen to the MIEC, and serves to accelerate the surface exchange kinetics of oxygen molecules. The oxygen reducing layer generally has high stability and catalytic activity for $O_2$ reduction, and the electrocatalytic activity of the oxygen reducing layer coupled to the MIEC backbone strongly enhances the performance of the cathode.

Figure 1:
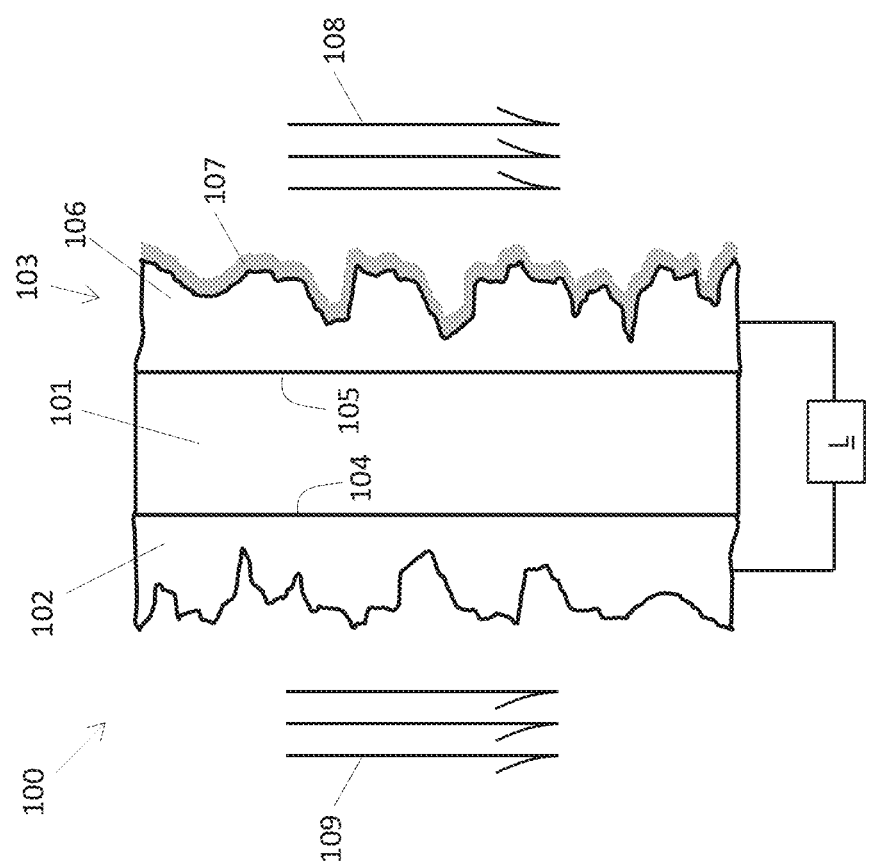
FIG. 1 illustrates a particular embodiment of the anode, electrolyte, and cathode.

A fuel cell according to this disclosure is illustrated at FIG. 1. At FIG. 1, the fuel cell 100 is comprised of an electrolyte 101, an anode 102, and a cathode represented generally at 103. Anode 102 is electrically coupled to electrolyte 101 at first surface 104 of electrolyte 101, and cathode 103 is electrically coupled to electrolyte 101 at second surface 105 of electrolyte 101. Additionally, cathode 103 comprises MIEC 106 and an oxygen-reducing layer 107. As illustrated at FIG. 1, oxygen-reducing layer 107 is in contact with MIEC 106, and MIEC 106 is generally between and separating oxygen-reducing layer 107 and electrolyte 101. Oxygen-reducing layer 107 is comprised of single element oxides, single element carbonates, or mixtures thereof, and has a thickness on MIEC 106 of less than about 30 nanometers (nm). In a particular embodiment, oxygen-reducing layer 107 has a thickness of less than about 10 nm, preferably less than 5 nm. In another embodiment, oxygen-reducing layer 107 has a thickness of less than about 10 monolayers, preferably less than 5 monolayers, and more preferably about 3 monolayers or less. Typically, oxygen-reducing layer 107 is substantially comprised of either oxides or carbonates.

Here "single element oxide" means an oxide having a composition $M1_aO_b$ where M1 is a cation consisting of one element. In a particular embodiment, M1 is Ca, Mg, Sr, Ba, Sc, Y, Ce, Th, U, Sn, Al, Si, Ti, Zr, Hf, Mn, Zn, Ta, Nb, Ge, Ga, In, a Lanthanide, or mixtures thereof. Similarly, "single element carbonate" means a carbonate having the composition $M2_c(CO_3)_d$ where M2 is a cation consisting of one element. In a particular embodiment, M2 is Ca, Mg, Sr, Ba, Sc, Y, Ce, Th, U, Sn, Al, Si, Ti, Zr, Hf, Mn, Zn, Ta, Nb, Ge, Ga, In, or a Lanthanide. Additionally, oxygen-reducing layer 107 may be comprised of a multiple oxides and/or carbonates, provided that M1 and/or M2 represent some single element cation. For example, oxygen-reducing layer 107 might be comprised of a mixture of single element oxides $Mi_nO_m$, and or single element carbonates $Mj_u(CO_3)_v$, where each Mi cation and Mj cation within an individual oxide or carbonate consists of one of Ca, Mg, Sr, Ba, Sc, Y, Ce, Th, U, Sn, Al, Si, Ti, Zr, Hf, Mn, Zn, Ta, Nb, Ge, Ga, In, or a Lanthanide. Here "Lanthanide" means the elements having atomic numbers 57-70. In a particular embodiment, M1 and/or M2 is one of the elements in Group 2, Group 3, or Group 4, or Mn, Zn, Ta, or Nb. In another embodiment, M1 and/or M2 is one of the elements in Group 2.

Further at FIG. 1, MIEC 106 comprising cathode 103 is a material having an electrical conductivity and an ionic conductivity, where the electrical conductivity is at least 100 S/m at 800° C., and where the ionic conductivity is at least 0.1 S/m at 800° C. In a particular embodiment, MIEC 106 comprises a crystal structure having a composition $A_xB_yO_{z-\Delta}$, where A and B are metals, O is an oxygen anion bonded to both A and B, and where x>0, y>0, z>0, z>$\Delta$, and $\Delta$ is a number indicating the deficient stoichiometry corresponding to the lattice oxygen vacancies. In an embodiment, B is a metal in Groups 4-12 and A is a metal in a Group other than Groups 4-12, including Lanthanides, Y, and Sc. Here, "metal" means any element represented on the Periodic Table of Elements with the exception of H, C, N, P, O, S, Se, and elements within groups 17 and 18. In a further embodiment, MIEC 106 has a perovskite crystal structure. Perovskite structures are particularly well suited because their properties can be adjusted in a wide range by doping on the A-site as well as on the B-site. See e.g., Richter et al., "Materials design for perovskite SOFC cathodes," *Monatsh Chem* 140 (2009), among others. In a still further embodiment where the crystal structure is a perovskite, A comprises La and Sr, and B comprises Co. Other embodiments include materials such as $La_{1-x}Sr_xMnO_{3-d}$ (LSM), $La_{1-x}Sr_xFeO_{3-d}$ (LSF), and $La_{1-x}Sr_xCo_{1-y}Fe_yO_{3-d}$ (LSCF) where La and Sr are on the A site and Mn or Fe or Co and Fe are on the B site. Additionally, MIEC 106 is typically a porous material comprising a plurality of pores, and oxygen-reducing layer 107 is in contact with the pore surface of some portion of the plurality of pores. In a particular embodiment, MIEC 106 has a porosity of from about 20% to about 70% such as, for example, about 50%. In another embodiment, MIEC 106 has an average pore size less than 1 µm, and in an additional embodiment, MIEC 106 has an average pore size greater than 0.3 µm. In a further embodiment the porosity can have a bimodal pore size distribution with a fine bulk pore size between 0.1 µm to 0.3 µm within 10 µm of the electrolyte and a pore size between 0.3 µm and 1 µm in the remainder of the bulk cathode. It is reasonably well established that the bulk of the cathode reaction occurs within 10 µm of the electrolyte so that the smaller pore size will have more surface area per volume without adding significant flow resistance where it is dead ended at the electrolyte whereas in the remaining bulk electrolyte where reaction rates are minimal the requirement for low flow resistance but adequate strength is more important. Porosity and pore size are determined using means known in the art. See e.g., Espinal, "Porosity and its Measurement," Characterization of Materials ($2^{nd}$ Ed., 2012), among others.

Electrolyte 101 is a material which conducts oxygen ions with relatively high ionic conductivity and virtually no electronic conductivity. Typical electrolyte materials are comprised of YSZ, scandia-stabilized zirconia (ScSZ) and gadolinium-doped ceria (GDC). Anode 102 is a material generally having relatively high electronic conductivity and high catalytic activity for hydrogen oxidation. A typical anode material is a Ni—ZrO2 cermet and which is porous in order to allow fuel to flow toward electrolyte 101. See e.g. Jacobson, "Materials for Solid Oxide Fuel Cells," *Chem. Mater.* 22 (2010), among others.

As discussed, cathode 103 is electrically coupled to electrolyte 101 and anode 102 is electrically coupled to electrolyte 101. In operation and generally, an oxidant 108 flows adjacent to cathode 103 and oxygen molecules comprising oxidant 108 generally contact cathode 103 where electrons are transferred to the oxygen molecule. A first electron is transferred at the surface and a second is postulated to be transferred in the vicinity of an MIEC vacancy, along with dissociation of the molecule to form an oxygen anion with two electrons attached. The oxygen molecules acquire electrons generating oxygen ions $O^{2-}$, and subsequently migrate through the bulk of MIEC 106 and enter the electrolyte 101 through second surface 105. The oxygen ions $O^{2-}$ migrate through electrolyte 101 to encounter a fuel 109 at an anode/electrolyte interface and react with the fuel. At anode 102, the fuel gives up electrons which move through the electrical load L and are supplied to the oxygen molecules as described, completing the circuit. As illustrated, the electrons transport through an external circuit electrically coupled to anode 102 and cathode 103 to provide electrical energy to load L. Depending on cell materials, the cell typically operates at temperatures of 500-1000° C. where ionic conduction by oxygen ions takes place. Here, the term electrically coupled with respect to the cathode and the electrolyte means a physical connection by which oxygen ions may transfer from the cathode to the electrolyte. Similarly, electrically coupled with respect to the anode and the electrolyte means a physical connection by which oxygen ions from the electrolyte may arrive at an anode/electrolyte interface. In both cases the electrical coupling may be physical contact between the respective components, or may involve physical contact with some intervening layer between the respective components. The intervening layer if present is generally a functional extension of either the anode or cathode, and typically prevents chemical or diffusive interaction between the bulk components during manufacture or operation. For example, detrimental reactions between electrolytes and cathode materials have been mitigated through the use of an intervening diffusion barrier/buffer layer, such as ceria. Such arrangements are within the meaning of "electrically coupled" within this disclosure.

As is understood and generally speaking, the ability to generate electricity in fuel cells at both high current rate and high efficiency is limited by the cathode in a well designed and manufactured cell. Oxygen reduction at the surface of the cathode is a slow reaction relative to hydrogen oxidation. It is postulated that a primary reason for this limitation is the electrostatic repulsion of the field resulting from the electronegative overpotential established at the cathode surface with respect to the oxygen ions that exist near the cathode surface prior to incorporation in the ionically conductive cathode/electrolyte lattice. Measurements indicate the oxygen reduction polarization exceeds the hydrogen oxidation polarization by more than a factor of 10 at reasonable operating current densities.

Without being bound by theory, one function of oxygen-reducing layer 107 in contact with MIEC 106 is to shield the electronegative surface of cathode 103, and to meter electrons consistent with the reaction rate and thereby increase oxygen ion residence time in the vicinity of the MIEC 106 surface. It is postulated that within the solid-gas reaction kinetics at cathode 103, oxygen-reducing layer 107 will screen the field due to the electronegative overpotential enabling a higher density of negatively charged oxygen ions near the MIEC vacancies rather than being driven away from the surface by the field. A second function of oxygen reducing layer 107 is to reduce the surface work function to promote electron transfer in the vicinity of the surface of cathode 103. It is also anticipated an enhanced Van der Waals effect will exist between the dielectric oxygen reducing layer 107 and the neutral oxygen molecules comprising oxidant 108 which will further screen the surface field and assist in maintaining a supply of neutral oxygen molecules at the cathode 103 to receive the transferred electrons.

Figure 2:
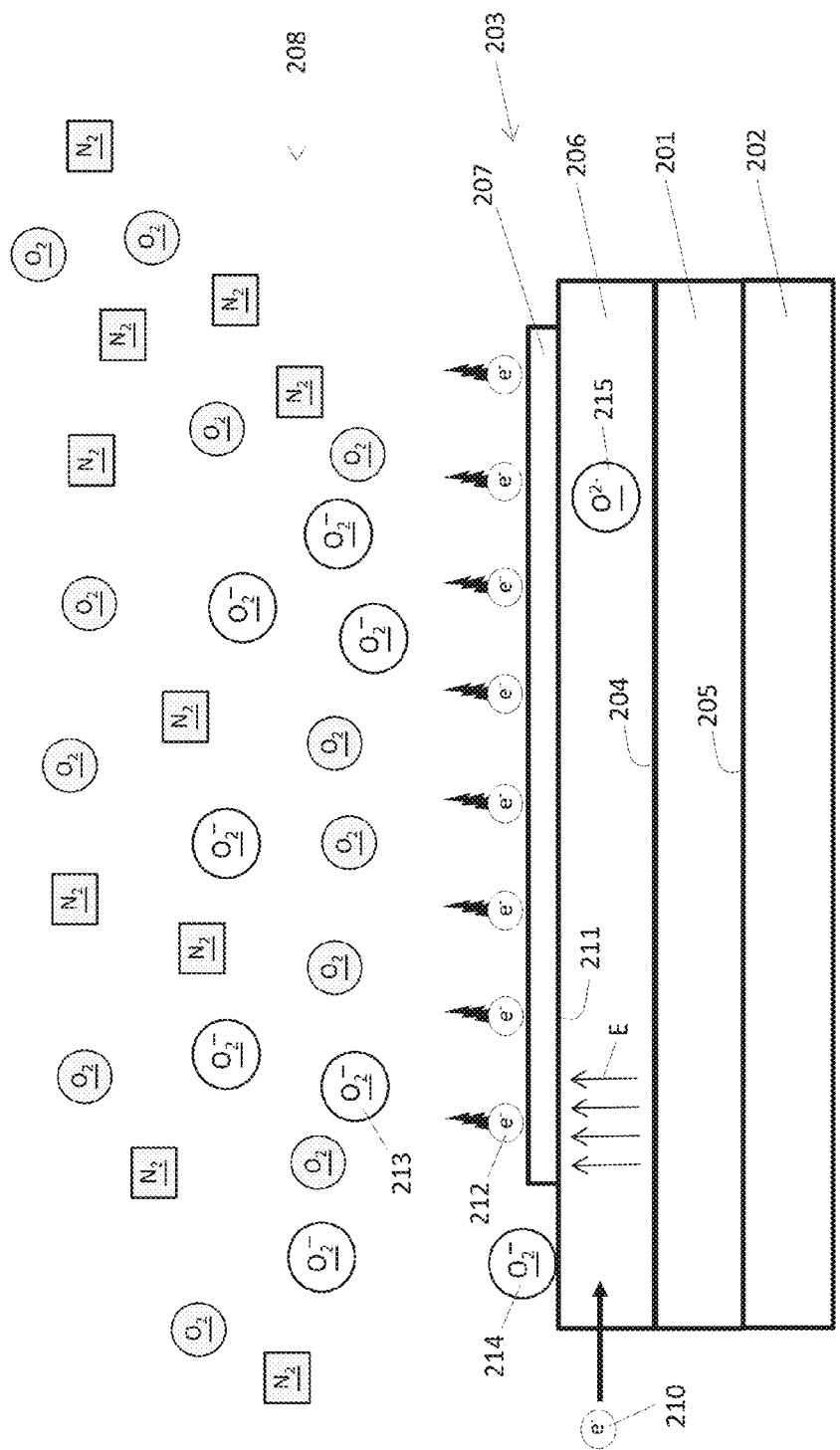
FIG. 2 illustrates a specific embodiment of the cathode.

These basic effects are graphically illustrated at FIG. 2, where a fuel cell comprises electrolyte 201, anode 202, and a cathode represented generally at 203, where cathode 203 comprises MIEC 206 and an oxygen-reducing layer 207. Additionally, oxidant generally indicated at 208 flows adjacent to cathode 203, where the oxidant 208 is air comprising $O_2$ and $N_2$, as indicated. Typically, in the absence of an oxygen-reducing layer such as 207, ionization of oxygen $O_2$ to oxygen ions $O_2^-$ would generally occur as a result of $O_2$ adsorption on MIEC 206, such as is illustrated by oxygen ion 214. This process is typically limited by oxygen saturation of the MIEC 206 surface during the process, as well as the presence of the electric field E within the cathode which opposes oxygen migration from oxidant 208 to the vacancies of MIEC 206. However, the presence of oxygen-reducing layer 207 and the corresponding presence of interfacial surface 211 where oxygen-reducing layer 207 contacts MIEC 206 acts to mitigate the impact of these fundamental limitations by enabling greatly increased electron transfer from cathode 203. At FIG. 2, an electron 210 enters cathode 203 via MIEC 206 and generally proceeds toward interfacial surface 211 of MIEC 206 under the influence of the electric field E, generated by charge separation between anode 202 and cathode 203. At the interfacial surface 211, contact between MIEC 206 and oxygen-reducing layer 207 provides a dielectric/insulator surface to reduce the surface work function. Correspondingly, an increase in electron transfer occurs as a result of the presence of oxygen-reducing layer 207 and the resulting dielectric/insulator surface represented by interfacial surface 211. This significantly increases the emission of electrons such as electron 212, and greatly increases the population of oxygen ions $O_2^-$ in the vicinity of cathode 203, such as oxygen ion 213. Additionally, the dielectric of interfacial surface 211 generates compensating charge which shields the oxygen ions $O_2^-$ from the electric field E. Correspondingly, a much larger volume of available oxygen ions $O_2^-$ become available on the surface of cathode 203, such as oxygen ion 214. This promotes increased current rates and efficiencies as the larger volume of available oxygen ions $O_2^-$ increases the diffusion of $O_2^-$ oxygen ions such as oxygen ion 215 through the bulk of MIEC 206, which subsequently generates increased oxygen ion transport through second surface 204 and electrolyte 201, and increased reaction with fuel at the anode/electrolyte interface represented by first surface 202.

As stated, oxygen-reducing layer 207 has a thickness on MIEC 206 of less than about 30 nanometers (nm), however in particular embodiments, oxygen-reducing layer 207 has a thickness of less than about 10 nm, preferably less than 5 nm. In another embodiment, oxygen-reducing layer 107 has a thickness of less than about 10 monolayers, preferably less than 5 monolayers, and more preferably about 3 monolayers or less. Reducing the thickness of oxygen-reducing layer 207 may further enhance electron emission, and in certain applications, thicknesses on the order of 5 monolayers and preferably about 3 monolayers or less may be recommended. There will be a balance between shielding and electron emission that will determine optimum thickness and coverage. The thickness of oxygen-reducing layer 207 may be determined using methods known in the art, for example, Transmission Electron Microscopy (TEM).

Additionally, oxygen-reducing layer 207 may form either a continuous or discontinuous film on MIEC 206, and may have any coverage ratio with respect to the contacting surface of MIEC 206. In a particular embodiment, oxygen-reducing layer 207 is a discontinuous film establishing a coverage ratio of from about 5% to about 50% on MIEC 206. In a further embodiment, oxygen-reducing layer 207 establishes a coverage ratio less than about 25%. Such coverage ratios can be advantageous for the mitigation of transverse (near-field) energy along the surface of cathode 203, so that the whole or some majority of energy is longitudinal. Additionally, the electron density dependent space charge becomes less significant at reduced coverage ratios, potentially providing increased electron distributions at the surface of cathode 203. The coverage ratio provided by oxygen-reducing layer 207 may be determined using methods known in the art, for example, Scanning Electron Microscopy (SEM)

In a particular embodiment, the M1 and/or M2 cation comprising the single element oxide or single element carbonate as applicable is a Group 2, Group 3, or Group 4 element. In a further embodiment, the M1 and/or M2 cation is a Group 2, Group 4, or Group 4 element in periods 3-6. Such elements are known to enable improved performance in electron emitting applications. In another embodiment, the oxygen-reducing layer further comprises a second single element oxide, second single element carbonate, or a mixture thereof, where the second single oxide has a composition $M3_eO_f$ and where the second single carbonate has a composition $M4_g(CO_3)_h$, where M3 and M4 are cations comprised of elements in Group 13 or Group 14. The inclusion of such additional oxides and carbonates may be utilized to aid in the stabilization of the single element oxide or single element carbonate comprising the oxygen-reducing layer. In a particular embodiment, M3 and/or M4 comprises Al, Si, Ge, Ga, or mixtures thereof.

Additionally, it is generally advantageous to select the M1 and/or M2 cation such that the resulting single element oxide or single element carbonate has a melting point greater than, and preferably at least 50% greater than, the anticipated operating temperature of the resulting SOFC. In an embodiment, the single element oxide and/or single element carbonate comprising the oxygen-reducing layer has a melting temperature of at least 700° C., preferably at least 1200° C., and more preferably at least 1500° C.

The oxygen-reducing layer at the thicknesses described may be generated on the MIEC surfaces using means known in the art. For example, the oxygen-reducing layer may be generated through Atomic Layer Deposition (ALD) processes. See e.g., Liang et al., "Oxygen Reduction Electrocatalyst Based on Strongly Coupled Cobalt Oxide Nanocrystals and Carbon Nanotubes," *J. Am. Chem. Soc.* 134 (2012); see also Stair, "Synthesis of Supported Catalysts by Atomic Layer Deposition," *Top. Catal.* 55 (2012), among others. Other exemplary but non-limiting examples include Physical Vapor Deposition (PVD), Chemical Vapor Deposition (CVD), and other thermal evaporation or ablation techniques and variants known in the art.

Thus, disclosed here is a SOFC comprising an electrolyte, anode, and cathode, where the cathode comprises an MIEC and an oxygen-reducing layer. The oxygen-reducing layer is comprised of single element oxides, single element carbonates, or mixtures thereof, and has a thickness of less than about 30 nm. In a particular embodiment the thickness is about 3 monolayers or less, and may be a continuous or discontinuous film. The oxygen-reducing layer and the MIEC screen electronegative overpotentials while metering electrons to the cathode surface, reducing the surface work function and promoting oxygen ion lifetime in the vicinity of the cathode.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A solid-oxide fuel cell, comprising:
an electrolyte;
an anode electrically coupled to a first surface of the electrolyte; and
a cathode electrically coupled to a second surface of the electrolyte, the cathode comprising,
a mixed ionic-electronic conductor, where the mixed ionic-electronic conductor has an electrical conductivity and an ionic conductivity, where the electrical conductivity is at least 100 S/cm at 800° C., and where a ratio of the electrical conductivity to the ionic conductivity is less than $10^6$, and where the mixed ionic-electronic conductor comprises a crystal structure having a composition $A_xB_yO_{z-\Delta}$, where A comprises a first metal at the A-site, B comprises a second metal at the B-site, O is an oxygen anion bonded to both A and B, and where x>0, y>0, z>0, z>$\Delta$, and where $\Delta$ is a number indicating a deficient stoichiometry corresponding to lattice oxygen vacancies,
an oxygen-reducing layer contacting the mixed ionic-electronic conductor, where the oxygen-reducing layer has a thickness of less than about 30 nm, where the oxygen-reducing layer comprises a single element oxide, or a single element carbonates, or mixtures thereof, where the single element oxide has a composition $M1_aO_b$ and where the single element carbonate has a composition $M2_c(CO_3)_d$, and where M1 is Ca, Mg, Sr, Ba, Sc, Y, Ce, Th, U, Sn, Al, Si, Ti, Zr, Hf, Mn, Zn, Ta, Nb, Ge, Ga, In, or a Lanthanide and where M2 is Ca, Mg, Sr, Ba, Sc, Y, Ce, Th, U, Sn, Al, Si, Ti, Zr, Hf, Mn, Zn, Ta, Nb, Ge, Ga, In, or a Lanthanide.

2. The solid-oxide fuel cell of claim 1 where the second metal is a metal in Groups 4 through 12 and the first metal is a metal in a Group other than Groups 4 through 12.

3. The solid-oxide fuel cell of claim 2 where M1 is an element in Group 2, Group 3, or Group 4, or Mn, Zn, Ta, or Nb, and where M2 is an element in Group 2, Group 3, or Group 4, or Mn, Zn, Ta, or Nb.

4. The solid-oxide fuel cell of claim 3 where the oxygen-reducing layer has a thickness of less than about 5 monolayers.

5. The solid-oxide fuel cell of claim 4 where the oxygen-reducing layer is a discontinuous film and where the oxygen-reducing layer establishes a coverage ratio of from about 5% to about 50% on the mixed ionic-electronic conductor.

6. The solid-oxide fuel cell of claim 3 where the oxygen-reducing layer further comprises a second single element oxide, or a second single element carbonate, or a mixture thereof, where the second oxide has a composition $M3_eO_f$, and where the second carbonate has a composition $M4_g(CO_3)_h$, where M3 comprises an element in Group 13 or Group 14 and where M4 comprises an element in Group 13 or Group 14.

* * * * *